(12) United States Patent
Karle

(10) Patent No.: US 8,014,654 B2
(45) Date of Patent: Sep. 6, 2011

(54) SOFTBOX

(76) Inventor: Stefan Karle, Munich (DE)

( * ) Notice: Subject to any disclaimer, the term of this patent is extended or adjusted under 35 U.S.C. 154(b) by 0 days.

(21) Appl. No.: 12/584,729

(22) Filed: Sep. 11, 2009

(65) Prior Publication Data

US 2010/0124068 A1    May 20, 2010

Related U.S. Application Data

(60) Provisional application No. 61/099,445, filed on Sep. 23, 2008.

(30) Foreign Application Priority Data

Jul. 24, 2009   (DE) ..................... 20 2009 010 094 U

(51) Int. Cl.
*G03B 15/02* (2006.01)
(52) U.S. Cl. ........................................... 396/4
(58) Field of Classification Search .................. 396/4
See application file for complete search history.

(56) References Cited

U.S. PATENT DOCUMENTS

| 3,946,221 A | 3/1976 | Gandini |
| 5,556,186 A | 9/1996 | Pilby |
| 7,198,388 B2 * | 4/2007 | Pilby ............................. 362/325 |
| 7,609,949 B2 * | 10/2009 | Ealer ................................. 396/4 |
| 2006/0007666 A1 | 1/2006 | Cook |

FOREIGN PATENT DOCUMENTS

| DE | 20217782 | 2/2003 |
| DE | 202007009297 | 12/2007 |
| EP | 0917668 | 11/2002 |
| GB | 1456059 | 11/1976 |
| GB | 2425589 | 11/2006 |
| WO | 0219024 | 3/2002 |
| WO | 2004031849 | 4/2004 |
| WO | 2005098169 | 10/2005 |
| WO | 2005103563 | 11/2005 |

OTHER PUBLICATIONS

Lighttools: Why Soft Egg Crates, www.lighttools.com (Dec. 27, 2007).*

* cited by examiner

*Primary Examiner* — Rodney Fuller
(74) *Attorney, Agent, or Firm* — Thomas D. Wilhelm; Wilhelm Law, S.C.

(57) ABSTRACT

A softbox for a spotlight includes a device for mounting the softbox to the spotlight such that in operation, the spotlight shines through the softbox. For limiting the emerging angle of the light shining through the softbox, a light control grid is mounted at the light emitting aperture of the softbox. For mounting the light control grid to the light emitting aperture of the softbox, a frame surrounds the light emitting aperture of the softbox. The control grid for being mounted to the softbox is manufactured by fixing adjacent strips of a light absorbing material to one another.

20 Claims, 9 Drawing Sheets

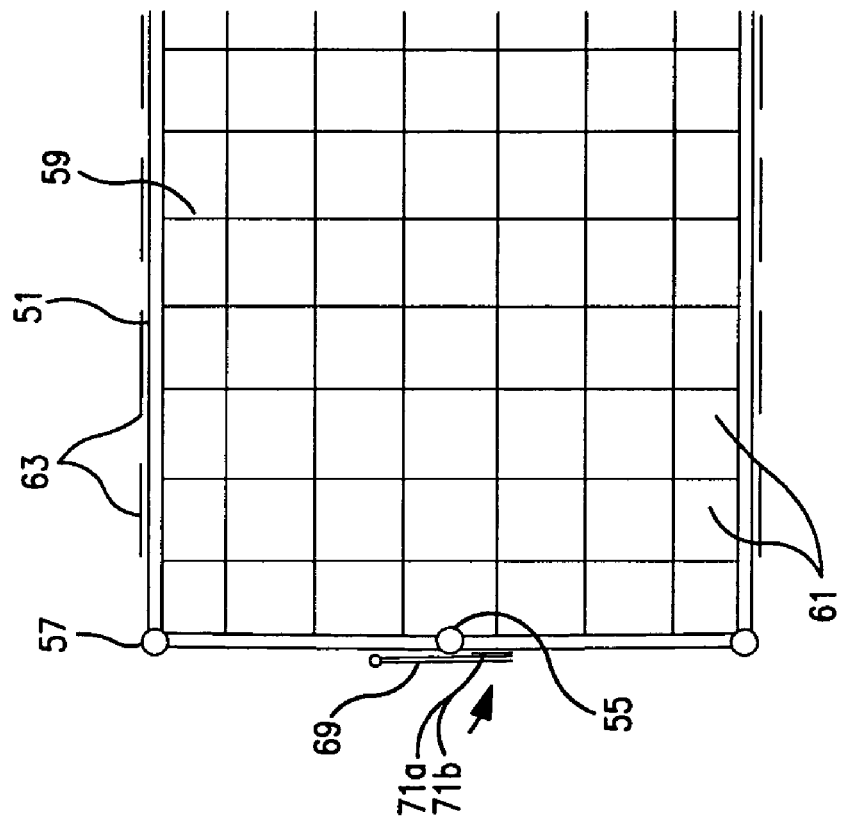
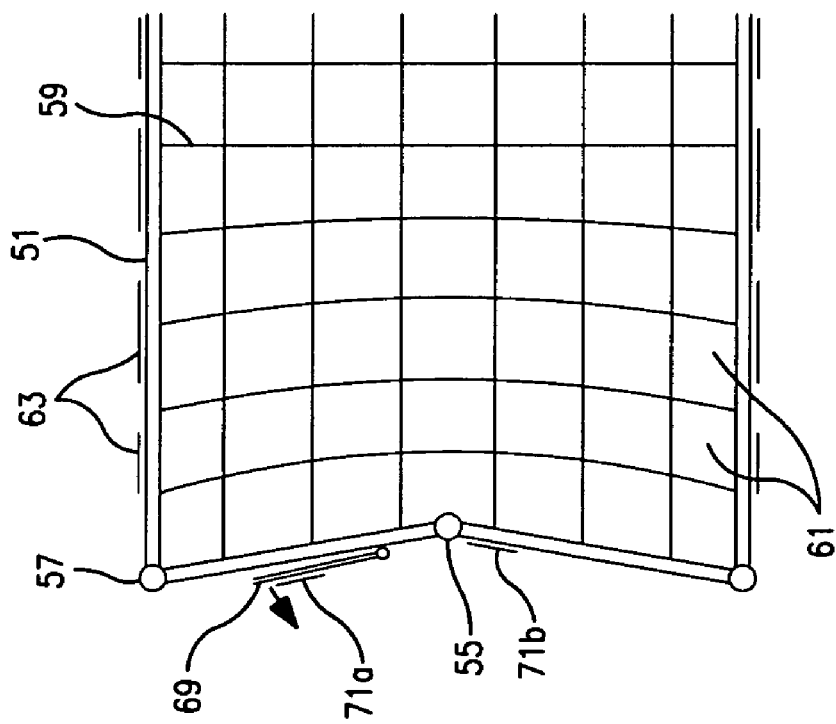

SOFTBOX

BACKGROUND OF THE INVENTION

The present invention relates to a softbox for a spotlight source, comprising an attachment device and a light control grid, and to the latter devices as such.

Light diffusion boxes, also known as softboxes, have long been used by photographers and camera crews to provide diffused lighting and to prevent hard shadows. Collapsible or otherwise disassemblable softboxes are especially useful for location shooting, because they are lightweight and transportable. Typically, they comprise a supporting structure of flexible rods over which a cloth is stretched. The inside surfaces of such softboxes may be coated with reflective material, as disclosed in German translation DE 698 09 374 T2 of European patent EP 0 917 668 B1. As compared to the actual spotlight source, such softboxes provide an enlarged light emission area so that each illuminated object point is struck by light beams from a larger solid angle range. Shadow borders thus blur to gradual black-white transitions.

It is known that the light emission from such softboxes is unsatisfactory insofar as the entire object environment is also illuminated by the same. In order to remedy this deficiency, control grids made of cloth are known which are positioned at the light emission side of the softbox and serve to absorb such light beams which exit from the same at large angles relative to the direction of illumination.

One such light control grid is disclosed in patent document U.S. Pat. No. 5,556,186.

A softbox is attachable to the spotlight source by means of a mounting structure as it is described in international application WO 2004/031849 A1.

Attachment of known softboxes to the spotlight source is not yet fully satisfactory and, moreover, the illumination effect attainable with conventional control grid is perceived to be still insufficient.

It is thus the object of the present invention to obviate these and other disadvantages.

SUMMARY

According to a first aspect of the invention, a softbox is provided, comprising a device for attaching the same to a spotlight source such that, in operation, the spotlight source shines through the softbox; a supporting structure for providing a light emission aperture of the softbox; and a control grid to be positioned at the light emission aperture of the softbox, said light control grid delimiting the light emission angle.

Said softbox facilitates both its assembly and the orientation of illumination in that the supporting structure can be mounted, in a position of non-use, in that the tension rods of the softbox are simply inserted into a corresponding receiving means provided in the attachment device and, by spreading the same, arrested in a use configuration. Moreover, an undesired illumination of the object surrounding is eliminated.

According to a second aspect of the invention, an improved device for attaching the softbox to a spotlight source is provided. The device comprises a receiver for accommodating a softbox supporting structure in a first operative mode, a coupling for rotatably positioning the receiver of the supporting structure at the spotlight source and plural light blocking flaps, also referred to as "barn doors", for laterally delimiting the light of the spotlight source in a second operative mode.

According to an embodiment, the supporting structure comprises plural components which are positioned between, and alternate with, the hinges of the barn doors. According to further embodiments, the components are provided to be pivotal about pivot axles or also arrestable in a use configuration. According to a preferred embodiment, the pivot axles of the attachment components and the pivot axles of the barn doors form part of the same wire which encloses the light emission aperture of the spotlight source. To this end, the wire is preferably of generally octagonal shape having four longer sides of mutually the same length and four shorter sides of again mutually the same length extending alternately in circumferential direction. In other embodiments, there are two like wires on opposite sides of the light emitting aperture, each wire having doubly bent ends, wherein the first bend forms an about 140° angle and the outer bend forms an about 50° angle to the other side. Thus, the middle portion of each wire can serve as an axis for one barn door, while the end portions of each wire can serve as axes for the adjacent barn doors. The components and pivot axles are preferably attached to a mounting ring which, in turn, is rotatably fixed to the spotlight source by means of three or four retainers. One of the retainers may be provided to be folded out in order to enable a lateral removal of the mounting ring if neither the barn doors nor the softbox are to be used. In embodiments, the attachment components include holes for receiving poles of softboxes with varying sizes, wherein the holes having different size also may be arranged at different angles to the light beam axis. The smaller sized holes may be formed inside the larger diameter ones, but somewhat deeper, to accommodate either kind of poles. For ease of handling, there may be provided a rotatable guiding member for the poles.

According to a third aspect of the invention, a control grid is provided comprising plural light-transmitting cells and a supporting structure for attaching a flexible strip of light-absorbing material, forming said cells, to a circumference of the light emission aperture of the softbox. The supporting structure may comprise pivotally connected rods, metal strips or similar elongate elements, or such element which are in themselves bendable. In order to stow the control grid, it is possible, in addition, to first release the supporting structure from the softbox, without the plural cells and cloth strips being entangled or intertwined. This facilitates the next assembly step. According to a preferred embodiment, two oppositely disposed shorter sides of the supporting structure each comprise a hinge and, optionally, a pivotal latch, by means of which the control grid can be folded in and out. According to further embodiments, the supporting structure comprises tensioning means which stretch tautly the cloth strip arrangement forming the control grid tautly in the unfolded state, thus ensuring that the control grid will not sag in its use configuration in front of the light emission aperture of the softbox independent of the spotlight source position and thus independent of the direction of illumination. The supporting structure may comprise one or more sides which are pre-tensioned to the outside and/or such sides whose pre-tension is temperature-dependent. In particular, such sides are preferred which comprise bi-metal strips which thus increase the tension exerted on the control grid with increasing temperature, e.g., by continued operation of the spotlight source. Moreover, the control grid may also comprise five, six, seven or, preferably, eight sides. Instead of using bi-metal strips, in embodiments it is also possible to employ transversely curved strips (single or pairwise) of spring-leaf steel, which steel strips have the property of being bendable at desired locations, whereby the portions to both sides of the bend are stiffened and at the same time exert a tensioning force on the strip. Each such steel strip is in use bent to an L-shape, such that two steel strips on opposing sides together form the sides of a rectangle spanning the control grid array.

In this embodiment the steel strips may be accommodated in sheaths. In a non-use state, the steel strips will de-bend and may then be curled up together with the control grid, and stowed away. In some embodiments, pairs of counter-curved steel strips may be used.

In another embodiment, a control grid (sometimes referred to as "butterfly") is provided which is particularly suitable for being attaching to a larger light emitting aperture and to this end comprises fastening elements including a flexible, elastic component for attachment to a rigid frame. In embodiments, the fastening elements each comprise a rigid part and a flexible elastic part, wherein the rigid part serves to attach the control grid thereto, while the flexible-elastic part may be wound around the frame of a component thereof and may then be fixed to the rigid part. To this end, the rigid part includes, in some embodiments, a clamp for a string serving as the elastic component. In embodiments, the rigid part includes a latch which may be opened and closed, in which latch a holding strip of the control grid may be received.

According to fourth and fifth aspects of the invention, methods of manufacturing a control grid are provided. According to the fourth aspect, a continuous strip of flexible light-absorbing material is laid into loops, said loops being alternately sewn together such that light-transmitting cells are formed. As against that, according to the fifth aspect, plural strips are laid upon each other and then sewn together in the same way. The resulting strip arrays may be configured such that, when being outstretched, a rectangle is formed, since this shape usually corresponds to the light emission aperture of the softbox. An octagonal array is, however, also possible. The seams are preferably spaced apart from each other by such a distance that the cell circumference is about 1.5 to 7 times the strip width (typically 5 cm or 7.6 cm, generally 4-9 cm). With such dimensions illumination cone angels of 20° to 60° are achieved. The shape of the cells is, for example, approximately quadratic. In order to attain this, the seams of successive strip or loop pairs are disposed symmetrically offset from each other (i.e., by half a seam distance). According to further embodiments, the seams are provided over the entire or almost the entire width of the strips, which prevents the strip array from sagging in case the spotlight source is positioned obliquely. Such a sagging would affect the control effect exerted by the light grid. Double seams may also be provided disposed next to each other so that the cells are of generally hexagonal shape. In particular, when (ultrasound) welded seams are used, same may each consist of two seams close to one another, between which a thin tube is formed additionally stiffening the control grid. Also, in embodiments filaments of a less flexible (stiffer) material may be worked into the fabric from the start, preferably arranged in the direction of the light beam passing through the grid. In other embodiments, the seams are replaced by adhering portions where an adhesive is applied to the strips e.g. alternatingly to both sides of the strips.

The supporting structure is provided on the outside with a retaining means at least over sections, preferably with hook-and-loop material strips, in order to enable the attachment to the enclosure of the light emission aperture of the softbox. The supporting structure, in turn, is fastened to the outside of the strip or loop array or accommodated in a bag formed by the same. According to preferred embodiments, the supporting structure is of rectangular or octagonal shape. The corners of the supporting structure and, optionally, two opposite (narrow) sides of the same are pivotally provided in order to enable the same to be collapsible. Herein, the joints may connect two elements which by themselves are rigid, or bendable elements form the corners of the structure. In embodiments, two elements are positioned in a tube-like sheath enclosing the control grid strip array, which sheath accordingly has at least one opening. The two elements are each bent at a position away from their center, and thereby each provide one short side and one long side of the rectangle. To the end of being reversibly bendable, the elements may be single or double strips of transversely curved metal strips made of spring leaf steel or the like. Such elements may simply be curled up together with the enclosed control grid strip array. In other embodiments, the sheath receiving the elements is itself attached at the softbox, and the control grid is affixed thereto from the inside of the polygon by means of hook-and-loop fasteners or the like.

For blocking undesired light beams having a large angle with respect to the normal of a large light exit plane, the control grid is in some embodiments surrounded by a strip which has several elastic holding straps at its outer circumference. Rigid parts of tensioning components engage into these elastic holding straps, which rigid parts may be configured to be opened/closed for attachment to the holding straps. The rigid parts each have an elastic flexible part, e.g. a string made of a resilient material, which part is wound around a frame present and is then fixed to a clamp of the rigid part. With such an arrangement, the control grid may easily, quickly and securely be fixed to a frame having arbitrary cross section. Te rigid part may have recesses adapted for several common frame cross sections.

According to a sixth aspect of the invention, a softbox is provided, which in addition to an optional control grid comprises an arrangement for securing the softbox to a spotlight in such a manner that the spotlight shines through it; comprises a frame for proving a light emitting aperture; or includes a control grid for arrangement at the light emitting aperture.

This softbox simplifies its mounting and also the light directing, insomuch the frame may be mounted by simply inserting the tensioning poles of the softbox into respective recesses of the attachment device in a non-use position, and stretched out into the use position followed by arresting in the stretched-out position. In addition, an undesired lighting of the object surroundings may be avoided.

According to a seventh aspect, embodiments provide an improved device for attaching the softbox to a spotlight. The device includes one or more components for receiving a softbox frame in a first operation mode, an optional coupling for mounting the receiving components, preferably rotatably, to the spotlight, and plural light blocking flaps ("barn doors") for laterally delimiting the light beam in a second operation mode.

Further advantageous embodiments and details are evident from the dependent claims, the following description and the attached drawings.

BRIEF DESCRIPTION OF THE DRAWINGS

In the drawings,

FIGS. 6A, B are schematic top views of a further control grid according to an embodiment in two unfolded positions.

DETAILED DESCRIPTION OF THE ILLUSTRATED EMBODIMENTS

Figure 1:
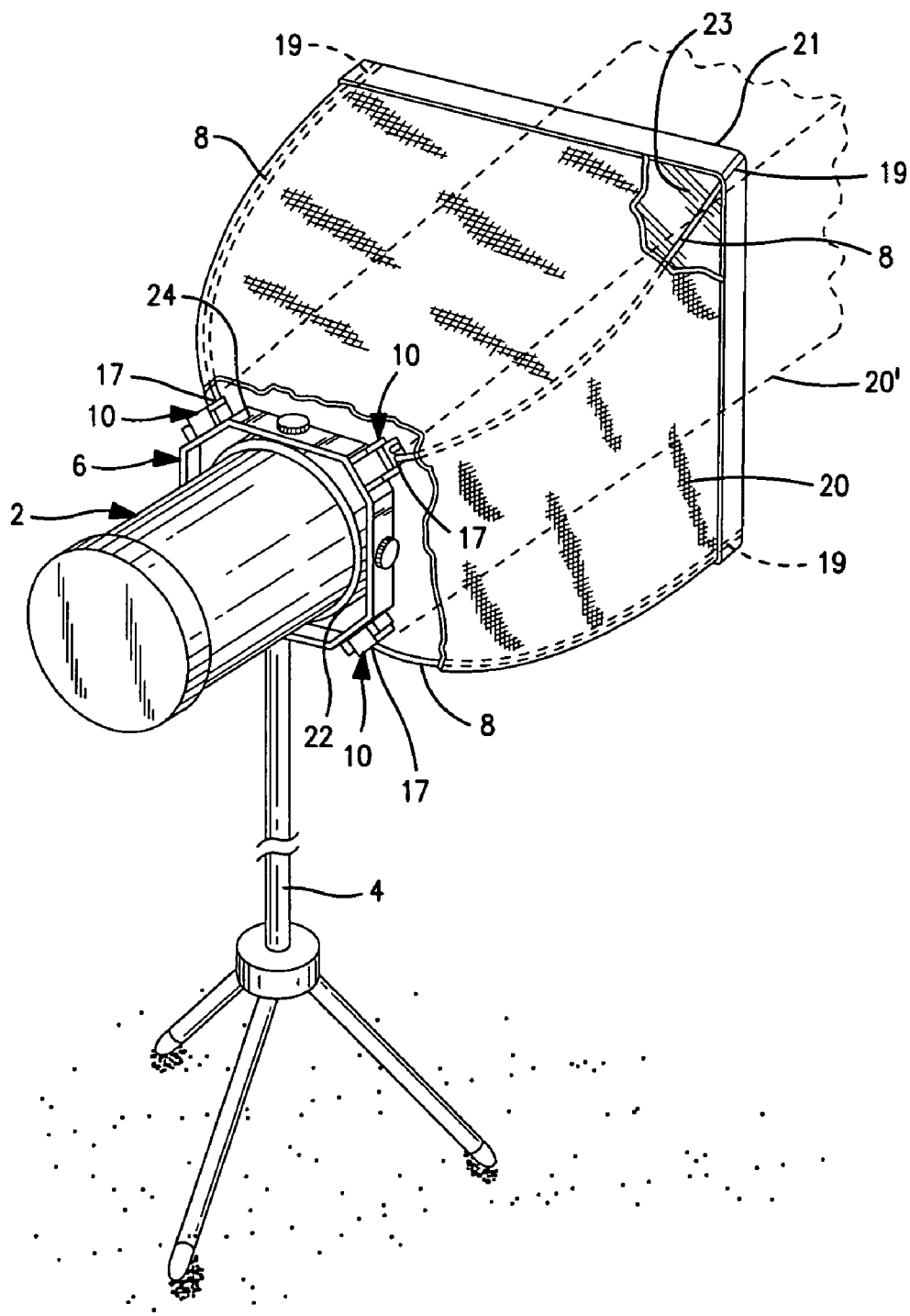
FIG. 1 shows a conventional softbox with an attachment device for attaching the same to a spotlight source.

In a conventional softbox 20 illustrated in FIG. 1, four cloth-clad rods 8 which extend from the softbox are inserted into holes 17 of blocks 10 which, in turn, are fixed in position to a spotlight source 2 by means of a frame 6. The frame 6 is formed by a metal sheet strip 24 and fastened to a stand 4. The light emission aperture of the spotlight source 2 is enclosed by a mounting ring 22 to which the frame 6 is releasably attached. The light emission aperture 21 of the softbox comprises a translucent covering 23 and receiver 19 for accommodating the rods 8. The blocks 10 are tiltable, allowing the rods 8 to be collapsed (position 20' of the softbox). If light gates, also referred to as barn doors, are to be used, the softbox 20, together with the attachment device, must first be disassembled from the frame 6 and blocks 10.

Figure 2:
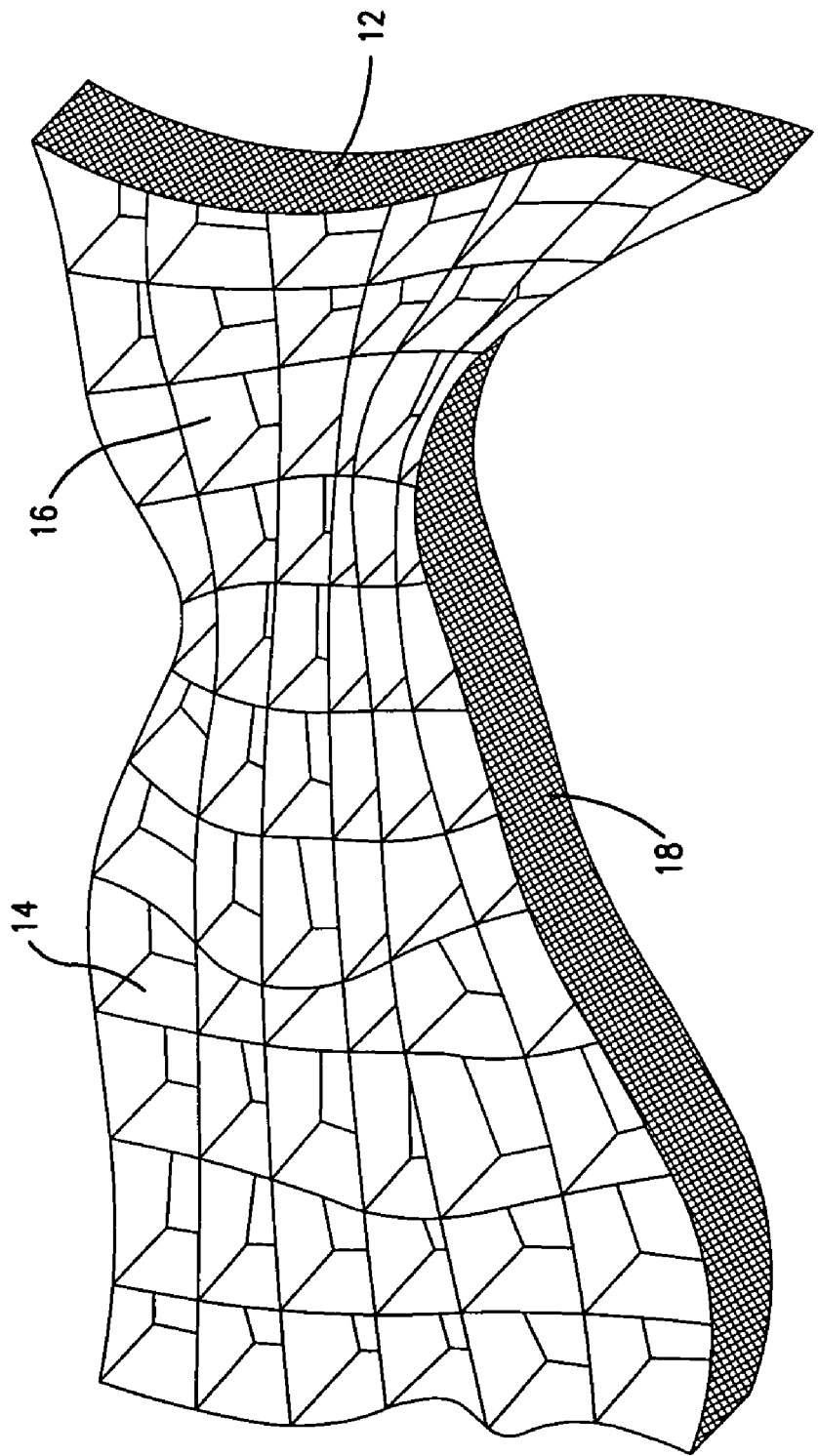
FIG. 2 shows a conventional light control grid made of cloth strips.

In the conventional control grid according to FIG. 2, differently slotted textile strips 14, 16 are inserted into each other crosswise. This array is attached to a surrounding textile strip 18. A hook-and-loop fastener 12 is provided on the outside for attachment to a softbox.

Figure 3:
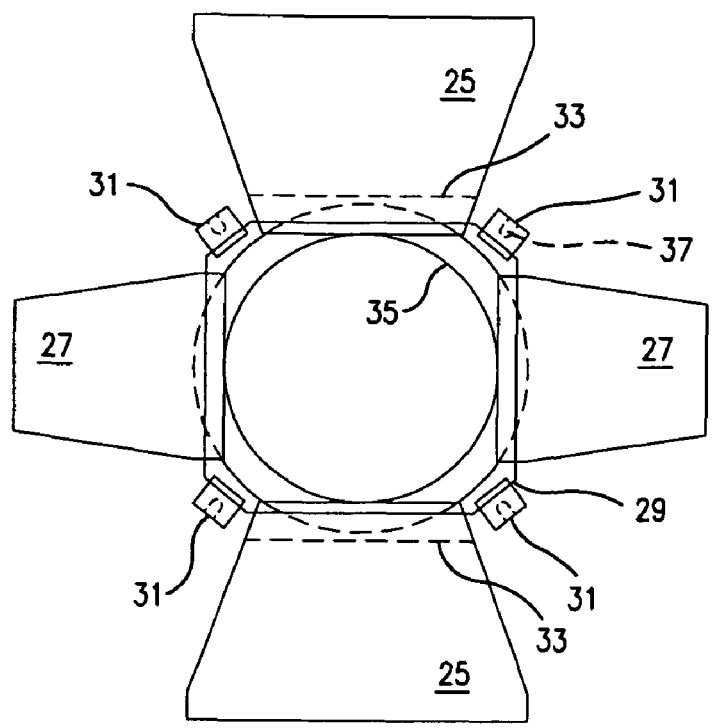
FIG. 3 shows a top view of a light gate or barn door and softbox support mount according to one embodiment of the invention.

In the embodiment of the invention according to FIG. 3, four schematically shown barn doors, namely two relatively larger barn doors 25 and two relatively smaller barn doors 27, are pivotally connected to an octagonal mounting frame 29. The relatively smaller barn doors 27 are of generally trapezoidal shape, the longer bottom sides being disposed towards the mounting frame 29. The relatively larger barn doors 25 are also of generally trapezoidal shape, however, the shorter bottom sides are disposed towards the mounting frame 29 and the outer edges of the trapezoid are truncated. As against that, the inner corners of the smaller barn doors are truncated. The sides of the barn doors 25, 27 disposed towards the mounting frame 29 are of equal length in the shown example. However, in another variant, the larger doors may also be rectangular. The larger barn doors 25 exhibit folding lines 33 at which they are slightly folded inwardly in order to lie, in collapsed position, above the smaller barn doors 27 lying inside. Between the sections of the mounting frame 29, at which the barn doors 25, 27 are pivotally attached, there are positioned shorter sections, to which the receiving blocks 31, with blind holes 37 for receiving the rods of the softbox, are pivotally fastened.

Figure 4:
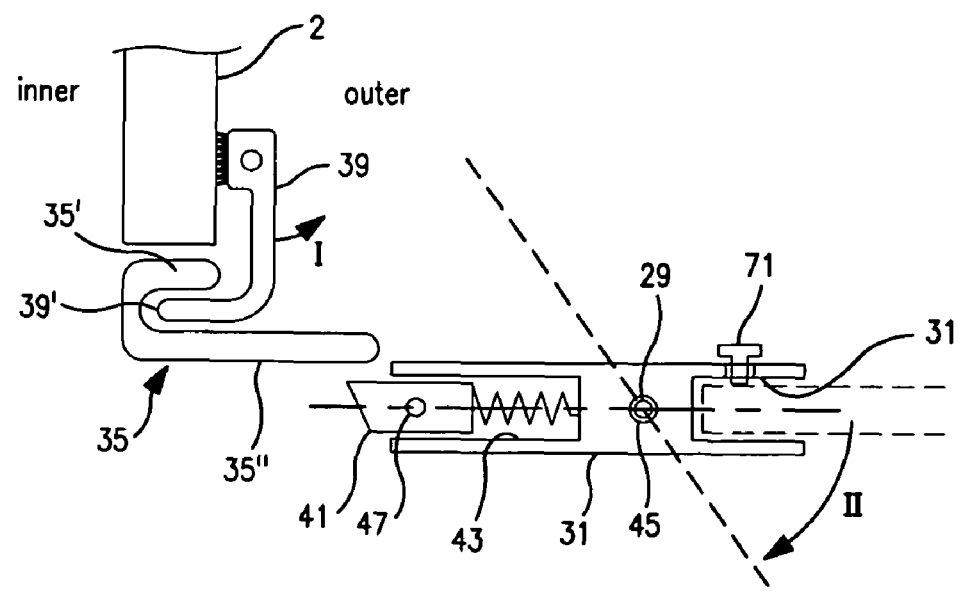
FIG. 4 shows a detailed view (diagonal section) of the attachment device according to FIG. 3.

The mounting frame 29 is fastened to a circular ring 35 having a generally U-shaped cross-section, the legs 35', 35" of the "U" being of different length and extending outwardly (see FIG. 4). The shorter leg 35' which, in the assembled state, is disposed towards the spotlight source 2, serves for rotatably mounting the circular ring 35 to three or four corresponding slide or roller clamps 39 of the spotlight source 2, one of which is capable of being folded out in order for the circular ring 35 to be laterally removed (arrow I). The clamps 39 comprise jaws 39' for engaging behind the shorter leg 35' of the circular ring 35. In order to support the mounting frame, for example, four spaced apart metal sheets (not shown) are welded to the longer leg 35" of the circular ring 35, namely approximately centrally relative to the respective two-part pivotal attachments of the barn doors to the mounting frame 29. The structure serving as coupling between the receiving blocks 31 accommodating the softbox rods and the spotlight source 2 is coated in mat black in order to ensure a low light reflection and a high heat release.

As is evident from FIG. 4, opposite to the blind holes 37 accommodating the tension rods of the softbox, each block 31 comprise a snap 41 guided in a guide 43 for releasably engaging behind the longer leg 35" of the circular ring 35. Moreover, each block comprises, between the blind hole 37 and the guide 43, a passage 45 for the, at this position wire-shaped, mounting frame 29 to pass through so that the blocks 31 are pivotal about the mounting frame 29. In the outwardly pivoted position, according to FIG. 4, in which the rods of the supporting structure of the softbox (broken lines) exert, due to their flexibility, a reset force on the blocks 31, the snap 41 can engage behind the circular ring leg to thus fix the softbox in its tensioned position. Due to the reset force, the friction between the rods and the blind holes 37 accommodating the same increases such that the rods are prevented from unintentionally escaping from the blind holes. In order to release the tension, the snaps 41 are actuated (in the present example by means of a laterally disposed pin 47 which extends through an opening in the side wall of the guide 43) so that the blocks 31 swivel inwardly due to the reset force exerted on the blocks by the frame rods (arrow II, longitudinal axis of the blocks shown in broken line in FIG. 4) and enable the softbox to be collapsed. In this position, the friction is low and the rods (broken line) can be removed from the blind holes 37 accommodating the same. In the depicted example the rods are fixed in position in the receiving holes by lateral clamping screws 71. In further variants, the blocks each comprises plural, in particular, two or three blind holes of different diameter in order for rods of different thicknesses of different softboxes to be attachable to the same mounting frame. In other variants, the pivot axes of the blocks do not form part of the preferably wire-shaped mounting frame, but are separate components which are attached to the mounting frame. In the detailed cross-sectional view of FIG. 4, it is apparent that the snap 41 engages behind the longer leg 35" of the circular ring and the clamping jaws 39' of the spotlight source engage behind the shorter leg 35' of the circular ring 35. The further outwardly the pivot axes of the blocks are provided the more favourable the leverage ratio.

Figure 5:
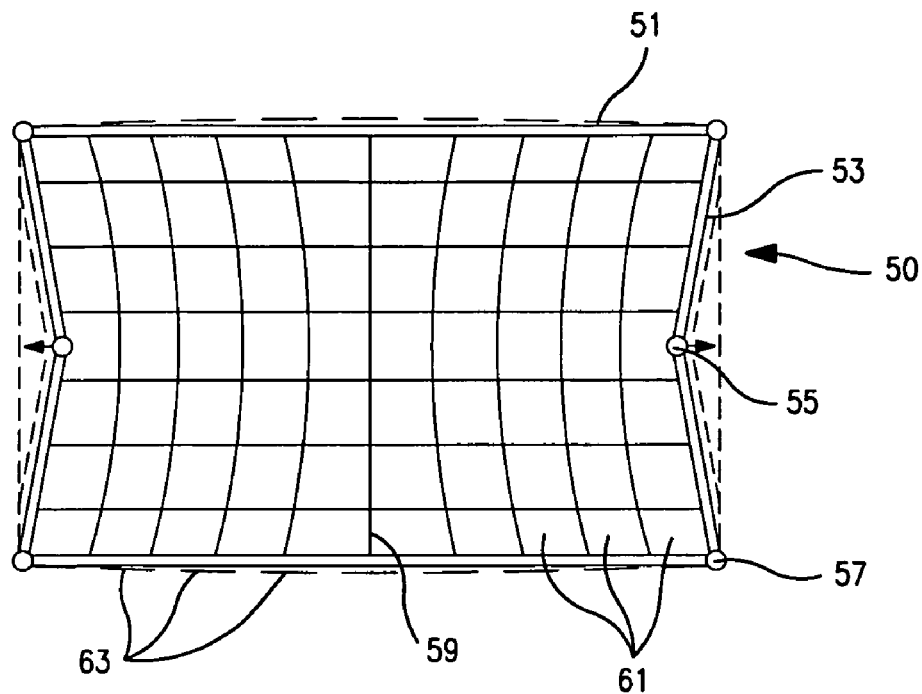
FIG. 5 is a schematic top view of a control grid according to an embodiment.

FIG. 5 shows a control grid 50 according to the invention together with a collapsible frame 51. The collapsible frame, forming a rectangular supporting structure 51 in its outstretched position, comprises a hinge 55 on each of its narrow sides 53, as well as further hinges 57 at the corners. When being unfolded (arrows), the supporting structure 51 spreads an array 59 of light-absorbing cloth strips which, in the present example, delimit cells 61 of substantially quadratic shape which allow light to pass through. The cloth strips have a width which is sufficient to absorb light beams which emerge from the softbox (in FIG. 5 positioned behind the control grid) at an angle to the axis of orientation of the light beams which exceeds a threshold value. Typical widths of the cloth strips are 2 to 12 cm, optionally 3 to 10 cm and further optionally 4 to 8 cm. Exemplary values are in particular 5.1 cm (2 Inches) and 7.6 cm (3 Inches). The cells have circumferences, bounded by the cloth strips, of between about 7.5 cm and about 35 cm depending on the desired light cone angle between typically about 20° and about 60° from the central axis of the light emission from the light source. The cone angle may, of course, be larger, depending on the light source. Hook-and-loop strips 63 are fastened at spaced locations along the outer perimeter of the supporting structure 51 for attachment to inner surfaces of complementary components disposed on an enclosure of the light emission aperture (21 in FIG. 1) of the softbox. In a variant, not shown, some of the sides of the supporting structure are provided with tensioning means (e.g., tension springs) for permanently stretching tautly the strip array accommodated within the supporting structure. In one variant, at least the longitudinal sides of the supporting structure (namely those sides without hinges) are formed of bimetal strips which bend outwardly with increasing temperature, thus causing the strip array to increasingly stretch with increasing temperature. This is particularly advantageous if the strips themselves tend to elongate considerably with increasing temperature, because, in this case, the bimetal strips counteract an increasing sagging of the strips. According to a further variant, rubber bands are provided on the outside of the corner hinges 57 and/or on the inside of the side hinges 55, such rubber bands being each connected to both hinge legs and thus drawing the supporting structure 51 toward its outfolded position.

In the embodiment according to FIGS. 6A, B, (metal) retainers 69 are pivotally connected to the narrow sides of the supporting structure 51, which when the supporting structure 51 is outfolded (arrow in FIG. 6A) can be folded over and refastened beyond the hinge 55 (arrow in FIG. 6B) by means of hook-and-loop strips 71a, 71b, or other fastening structure, thus stiffening the respective hinge 55. The hinges 55 are, for example and without limitation, each formed by flexible strips fixed on both sides (radially inside and outside) to the elongate members of the supporting structure. Alternatively, joints can be used. In addition, rubber bands may be provided on the insides of the hinges 55 (not shown) which are stretched when the supporting structure 51 is collapsed and promote the unfolding. Similarly, rubber or elastomeric bands may also be provided on the outside around the corner hinges 57. Instead of employing the above-described metal retainer, it is also possible to stiffen the hinges by use of a ring which is slidable along a hinge leg, which ring is formed with a protrusion which can be inserted into a receiving bush or loop of the other hinge leg (not shown) in the unfolded position of the supporting structure 51.

Instead of being quadrangular, the softbox may be otherwise polygonal, in particular of hexagonal or octagonal shape, depending on the shape of the softbox. In the latter case, the softbox can be unfolded and collapsed with ease even without additional hinges being provided in the sides of the supporting structure, namely in that first two opposite corners of the supporting structure are folded inwardly.

In the examples shown in FIGS. 5 and 6A, B, the cloth strips 59 are aligned in parallel to the sides of the outstretched rectangle 53. However, in some applications, a diagonal orientation is also useful: In the detailed view according to FIG. 7 it is schematically shown how the seams 65, 67, depicted as small ovals, are arranged offset from each other in adjacent strip pairs or loops 59a/b, 59b/c. Separate strips may be sewn together, or adjacent loops of a single long strip (broken line) may be sewn together. In any away, the seams 67 are spaced apart from each other to the same side of a strip by a distance A (measured along the strip) which corresponds to about the half of a cell circumference U. Adjacent seams 65, 67 on opposite sides of a strip 59b are offset from each other by a smaller distance $V \approx 1/2A$. If all strips 59a-c are selected to be of equal length, a strip array is obtained which fits with its outer dimensions in the above-described frame if the cells 61 are disposed diagonally in respect of the frame 53. In order to provide a parallel array, the strip or loop lengths are accordingly selected to be of different length, the longest strips being positioned in zigzag approximately along the diagonal of the rectangle defined by the supporting structure and the shortest strips being positioned near two of the corners of the rectangle defined by the supporting structure. Due to the flexibility of the strip material, the inner angles of the cell corners in the completely outstretched state are different from the acute and obtuse angle pairs $\phi$ shown in FIG. 7: Preferred are 90° inner angles or preferably angles in the range of 90°±20°. In one variant, all seams are provided in double adjacent to each other. This results into hexagonal cells with correspondingly larger inner angles of preferably 100° to 140°. Preferably, each of the seams is provided substantially over the entire strip width or at least over a major part (>50%) thereof. It is also contemplated to interconnect, at spaced apart positions, two or more strips already in the weaving step of the manufacturing of the strips. This technique is known to the skilled person.

Figure 8:
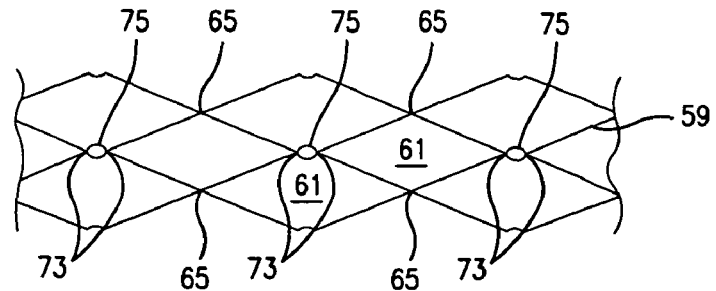
FIG. 8 shows another embodiment of the control grid in which double seams are provided by ultrasonic welding.

In another embodiment, the control grid is obtained by welding together, pairwise or in groups of three, strips 59 as shown in FIG. 8: The welding seams 73 are placed in pairs at a short distance, so that narrow tubes 75 of the strip material result at the welding positions, which impart additional stability on the grid. In variants not shown, stabilizing filaments are woven into the grid fabric from the start, in particular transversely to the strips.

In one embodiment, arrays of cells resulting from weaving or sewing two or more strips together are in turn fixed to one another by an adhesive or by ultrasonic welding.

Figure 9:
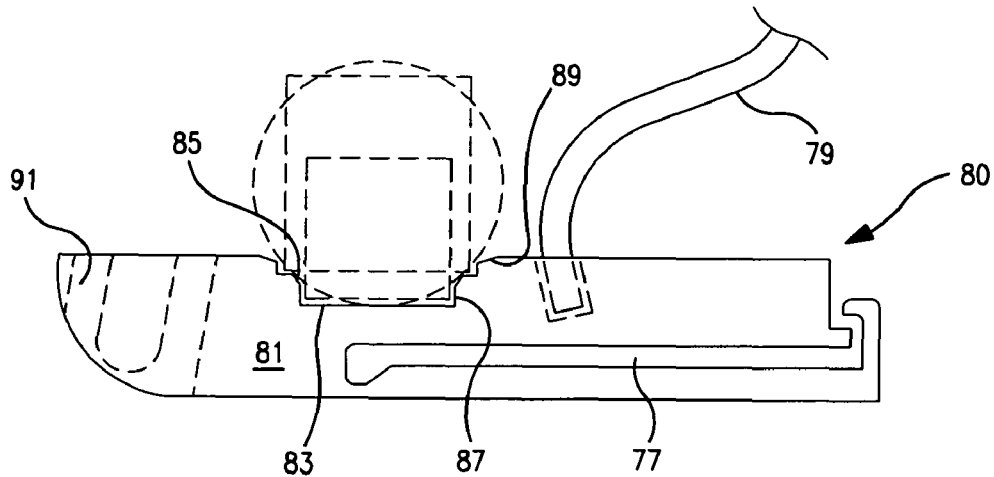
FIG. 9 shows a fastening device for securing a control grid to a surrounding supporting structure.

For larger light exiting apertures (e.g. rectangular with 4-20 ft side length), the stability of the light exiting aperture is provided by an external frame into which the control grid is hung. To this end, there are provided fasteners 80 which include an open/closeable receiving part 77 for securing strips of the control grid, and also include a quick-release detachable elastic string 79 for surrounding the frame (FIG. 9). In a rigid part 81 of each fastener, an edge-recess 83 is formed, the contour 85 of which corresponds to common frame cross sections via stepped portions 87 and chamfers 89; e.g., several polygonal and round profiles (indicated by dashed lines; e.g. 30 mm side length square, 42 mm diameter round, 48 mm diameter round). Thereby, the fasteners abut firmly at the frame. The elastic string 79 encircles the frame and may be tightened in the clamp 91. For releasing the string 79 from the clamp 91, it suffices to briefly pull the string out of the clamp in a circumferential direction. In this embodiment, it is preferred to provide securing strips at an outer circumference of the control grid, which securing strips may be accommodated in the receiving parts 77 of the rigid parts 81. For tightening the control grid outwardly, the securing strips may e.g. be formed of a resilient, elastic fabric. The securing strips may be formed as double loops, so that according to circumstances one or two layers may be received in the receiving parts 77, for thereby regulating the tensioning force to some extent.

Figure 10:
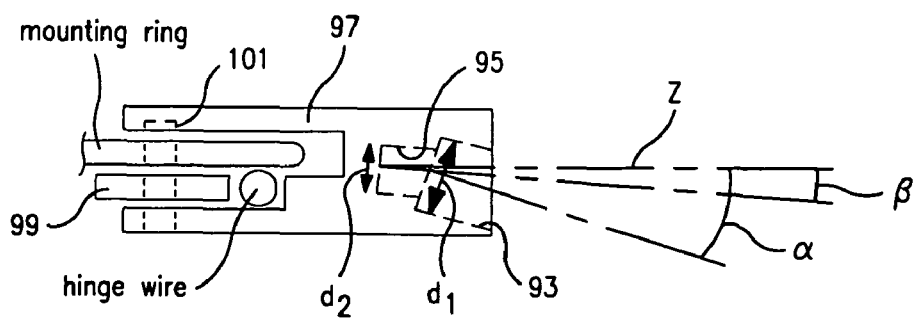
FIG. 10 shows another attachment device configured for receiving differently sized poles of a softbox.

FIG. 10 shows a further embodiment of the softbox attachment device (with, or without a control grid) similar to that of FIG. 3. In this embodiment, an attachment directly to the mounting ring is envisaged, which at the same time carries the barn doors: Each attachment component includes two blind 93, 95 holes formed in one another for softbox poles having different diameter $d_1$, $d_2$, which holes are formed at different angles $\alpha$, $\beta$ to the radial direction z: While the larger holes 93 have an angle of between 15° and 25° to the radial direction, the smaller holes 95 are formed at an angle of only 5° to 15°. For ease of de-mounting, the receiving clamps may include a lockable hinge (not shown). The clamps have a main part 97 and a spacer part 99 having a larger width for being positioned next to the mounting ring ("Drehkranz"). The two parts may e.g. be joined by screws 101.

The embodiment formed with hinges in the narrow sides of the supporting structure, e.g., realized by silicone hose pieces, on the one hand, allows the control grid to be collapsed to require as little space as possible in a non-use configuration of the same; and, on the other hand, to be temporarily collapsed in a configuration mounted to the softbox which allows to manoeuvre a softbox, which is only partially collapsed, for example, through a door opening, which would be impossible with a completely outstretched softbox of substantial size: usual softbox dimensions range between 30×40 cm and 135× 190 cm and even larger dimensions are not unusual. Moreover, the softbox can be partially folded in, for example, by releasing two diagonally oppositely disposed tension blocks from the mounting frame according to FIG. 3.

Figure 11:
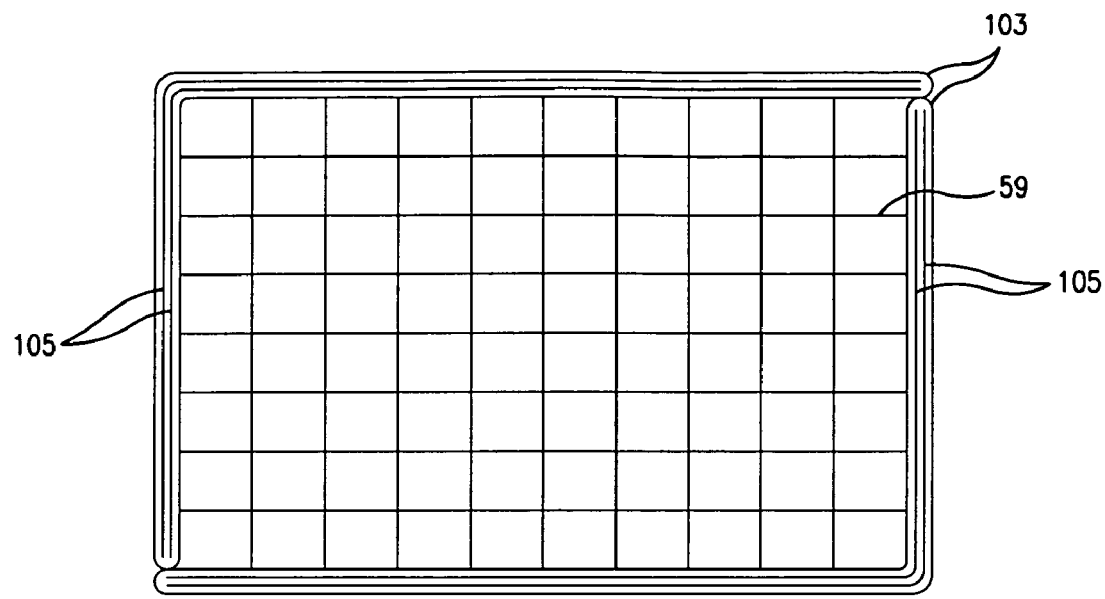
FIG. 11 shows another embodiment of a control grid with two flexible metal strips arranged at its circumference.
Figure 12:
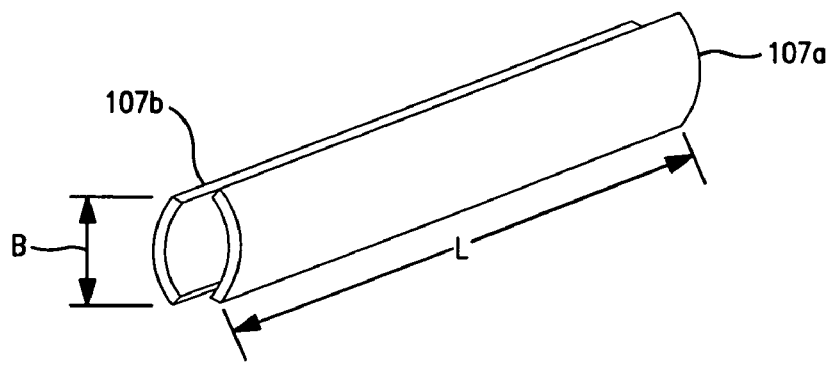
FIG. 12 shows an example of a pair of flexible metal strips for use in the grid of FIG. 11.

In further variants, the corners of the supporting structure can be provided preferably as multi-layered leaf springs which are pre-bent by 90° which, when the softbox is collapsed, are further bent. The advantage of a leaf spring in the hinge in the middle of the centre side resides in that at both ends of each side only an angle change of 90° to almost 0° is required, as against a larger change of 180° to almost 0° if only one leaf spring hinge is provided. E.g., in the embodiment of FIG. 11, two tube sheaths 103 are affixed to the control grid 59, in each of which a leaf spring steel strip 105 (or double strip) having 2-5 cm width is arranged. As shown in FIG. 12, a double strip would be formed from two leaf spring steel strips 107a, 107b which are transversely curved and arranged with their concave sides facing and abutting. The width B of each strip is about 2-5 cm, the curvature is 2 to 20 m$^{-1}$, corresponding to radii of 5-50 cm. Two or more pairs of strips may also be used; also, a single leaf spring steel strip may suffice. The strips are as long (length L) as the sum of a short side and a long side of the rectangle forming the light emitting aperture; where there is a polygonal aperture having more than four sides, accordingly half the circumference. Instead of two sheaths as in FIG. 11, a single sheath may be provided. If there are plural metal strips, it is preferable to attach these to one another by adhesive tape or the like to avoid their lateral displacement.

Moreover, in some applications, it is advantageous for the individual cells of the grid to be of rectangular shape, for example, with a side ratio between 4:3 and 11:3, or 5:3 to 8:3, the larger side length being preferably provided in the direction of the larger extension of the softbox aperture. However, in other applications, for example, for octagonal softboxes, a substantially concentric strip array with radial connections could be of advantage. For other applications, in turn, a rhombic cell array may be advantageous.

For larger light emission areas, e.g., so-called "butterflies", it is possible to provide several loops on the outside of each side of the light control grid and to screw pins to the frame of the butterfly for holding said loop. To this end, the holding pin and a U-bracket can each be cut from a piece of metal sheet and the bracket member can be bent into U-shape so that the bracket member can be shifted over the frame and attached thereto by means of clamping screws or the like. For the corners of the frame two bracket members are used for each corner holding pin at an angle of 90° relative to each other. It is appropriate for each retaining pin to be enlarged at its end in order for the loops to be unable to unintentionally slide away irrespective of the position of the butterfly, e.g., horizontally over the illuminated scene. The loops themselves are appropriately made of an expandable, rubber-elastic (stretch) material which facilitates to retain the loops on the holding pins and, moreover, the control grid is stretched such that it does not sag in any position. I.e., in this embodiment an elastic component is affixed to the control grid and a rigid component is affixed to the frame, while according to FIG. 9, the rigid component secures the control grid and the elastic component serves for attaching to the frame.

Figure 7:
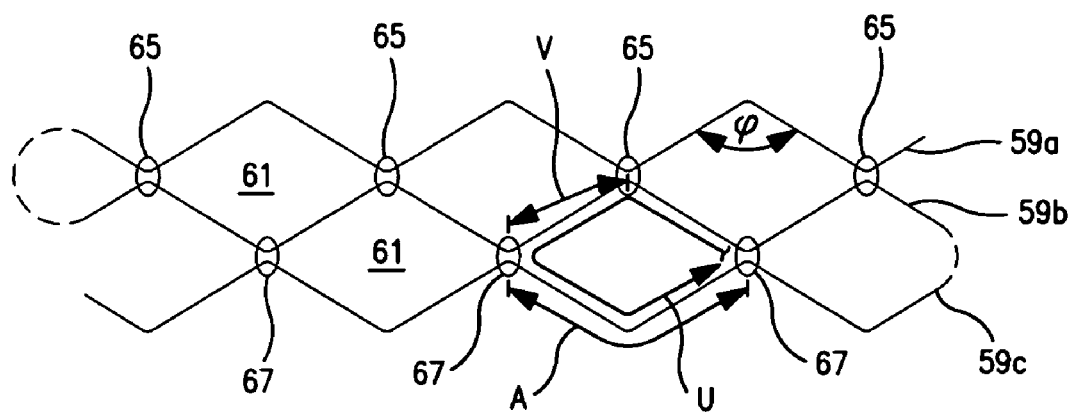
FIG. 7 shows an array of seams of the light control grid according to an embodiment.
Figure 13:
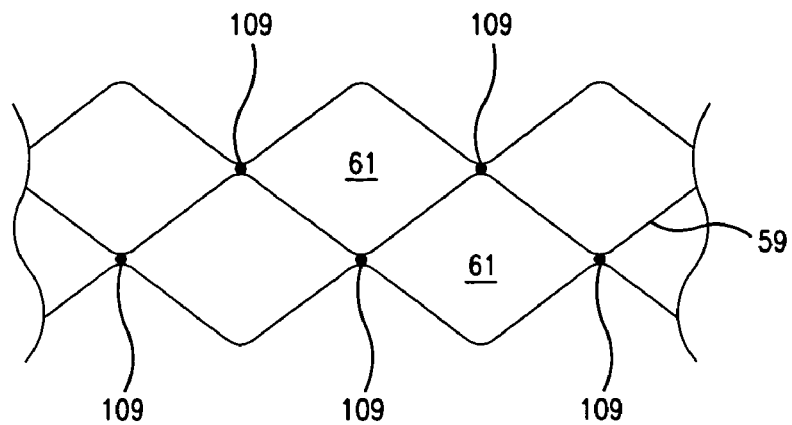
FIG. 13 shows another embodiment of a strip array of a control grid with adhering portions.

FIG. 13 shows another variant of the method for manufacturing the control grid: Herein, adjacent strips 59 of the light absorbing fabric are adhered to one another at adhering portions 109. The adhesive may be applied in advance to the strips using a transfer film. Otherwise, the dimensions of the cells 61 are similar to what is shown in FIGS. 7 and 8.

Figure 14:
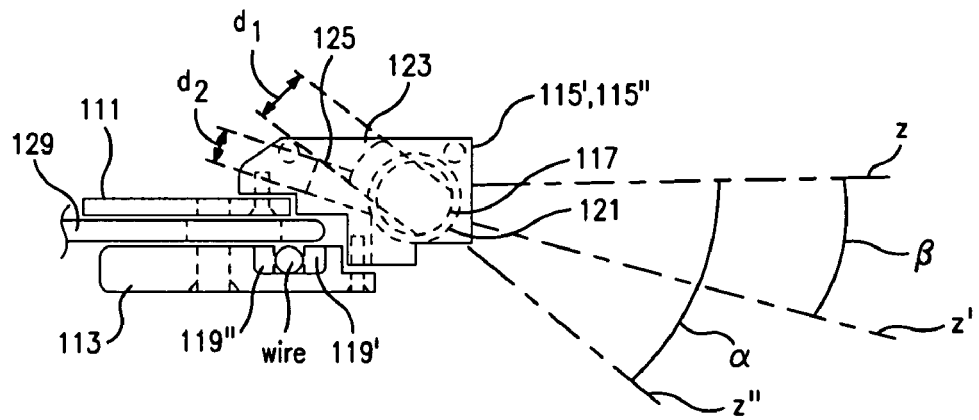
FIG. 14 shows another embodiment of an attachment device with a rotatable component.

FIG. 14 shows another variant of an attachment member for the poles of a softbox: The member comprises five parts 111, 113, 115', 115" and 117. Of these, parts 111 and 113 serve for mounting the device to the mounting ring 129. Parts 115' and 115" are essentially symmetric to one another (except for the screw holes) and together accommodate the rotatable part 117. Parts 115' and 115" are screwed to one another and screwed to parts 111 and 113. Part 117 serves to allow poles of different sizes to be inserted either into recesses 123 or into recesses 125, wherein recesses 123 have a larger diameter $d_1$ and their axis z" has a larger angle $\alpha$ to the radial direction z, while recesses 125 have a smaller diameter $d_2$ and their axis z' has a smaller angle $\beta$, but a larger depth. The part 113 has a recess accommodating the wire bearing the barn doors, which recess has protrusions 119' and 119" as more clearly discernible from FIG. 15: These protrusions 119' (single) and 119" (double) are spaced apart at a distance that the wire forming part of the mounting ring snugly fits between them, thus providing a firm three-point contact therebetween. The side wings 131', 131" of part 113 serve to distribute any bending loads imparted by the softbox to the mounting ring. The wings 131', 131" are slightly different in size to allow mounting the attachment members to differently sized mounting rings without blocking e.g. the pivoting of the barn doors. Several screw holes 133 are also shown, some of which may be threaded.

Figure 16:
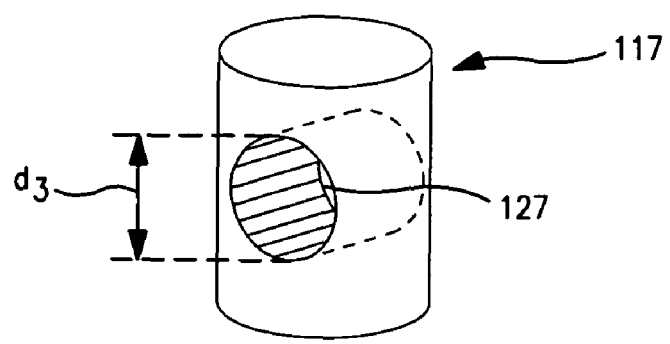
FIG. 16 shows the rotatable component of FIG. 14.

FIG. 16 shows an example of the rotatable member 117, and the through hole 127 of diameter $d_3$ formed therein. Note that $d_3$ should be somewhat larger than the largest pole diameter to be accommodated. The function is as follows: A pole is inserted into member 117, rotated until the pole orientation matches the hole orientation (z' or z" as the case may be), then inserted further until the pole end abuts the bottom of the according recess (123 or 125). The bending force exerted by the softbox on the pole suffices to fix the pole in the respective hole by friction forces. Conversely, if the pair of members 115' and 115" is made of aluminium, the member 117 should be made e.g. of stainless steel in order to avoid the occurrence of large friction forces which might otherwise fix member 117 in position.

Figure 15:
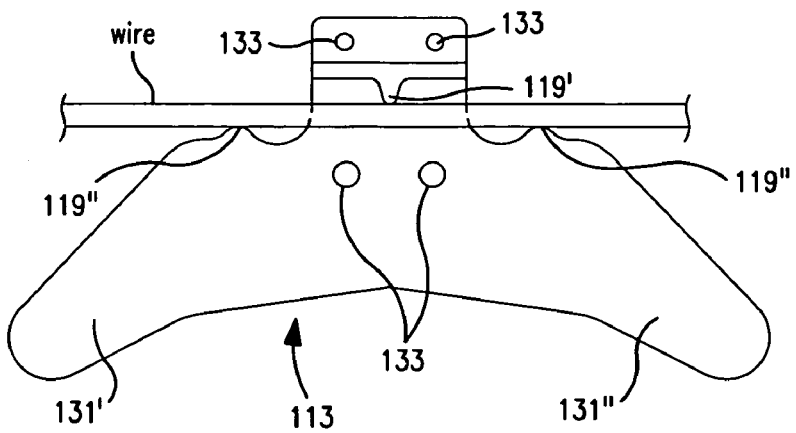
FIG. 15 shows one of the components of the attachment device shown in FIG. 14 from a different point of view.
Figure 17:
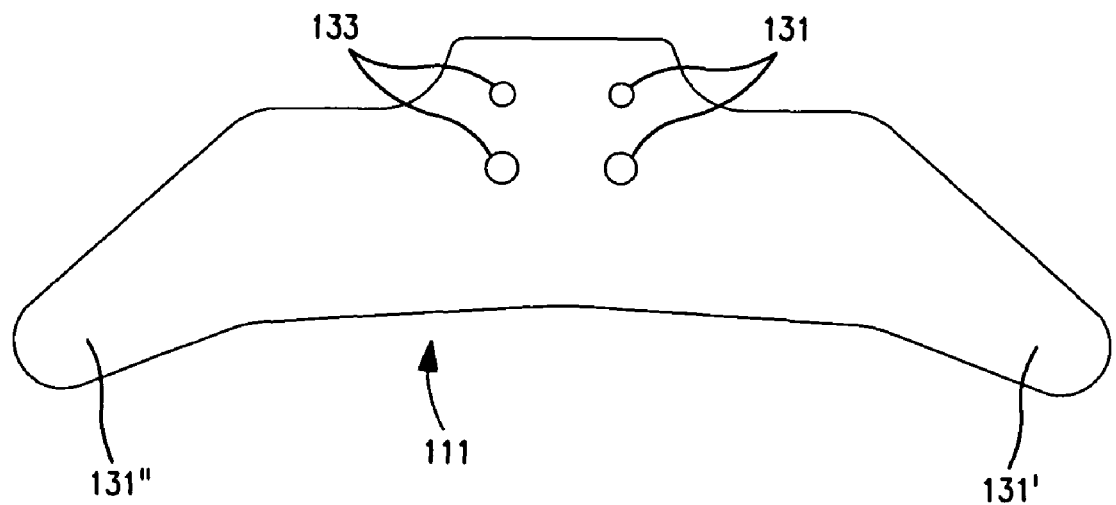
FIG. 17 shows the counterpart of the component of the attachment device shown in FIG. 15.

FIG. 17 shows the shape of counterpart 111, which merely has several screw holes 133 and the same wings 131' and 131" as part 113 shown in FIG. 15.

To summarize, different operation modes of the spotlight source are enabled: First, an operative mode in which the softbox is positioned in front of the light emission aperture of the spotlight source and the barn doors are folded away outwardly (but may still be inside the softbox); second, an operative mode with disassembled softbox and barn doors swung into the light cone for laterally delimiting the light emanating from the spotlight source; and, third, an operative mode with completely removed barn doors. Moreover, a light control grid may be comfortably and efficiently assembled in front of the light emission aperture of the softbox in the first operative mode.

The invention has been described above with reference to exemplary embodiments, but is not limited by the same, deference being given to the appended claims. Various variants and modifications embraced by the invention will be readily appreciable to the person skilled in the art. Moreover, not all advantages mentioned above are attainable with every embodiment.

The invention claimed is:

1. A control grid configured to be positioned at a light emission aperture of a light source, said control grid comprising:
    a side-by-side array of flexible strips of light-absorbing material which can be urged, from a collapsed configuration, into an expanded circumferential configuration defining an exterior of the strip array and an interior of the strip array, which strip array delimits light-transmitting cells such that light emanating from the light source, at an angle of at least 20 degrees from a central axis of such light emission source, impinges on the light-absorbing material; and
    a collapsible supporting structure extending about the exterior of the strip array, said supporting structure being configured to releasably attach the flexible strip array to an enclosure of the light emission aperture of such light emission source, said supporting structure comprising a plurality of side members, said side members being effectively connected to each other, said side members being collectively resiliently biased toward a configuration which corresponds to the expanded configuration of said strip array, and being collectively resiliently deflectable to accommodate the collapsed configuration of said strip array.

2. The control grid according to claim 1, said supporting structure comprising at least one leaf spring in a sheath, the combination of said at least one leaf spring and said sheath extending about the exterior of said strip array.

3. The control grid according to claim 2, wherein said at least one spring is positioned at least one of opposite and shorter sides of said supporting structure.

4. The control grid according to claim 2, wherein said at least one leaf spring is also positioned outwardly of an inner surface of said supporting structure.

5. The control grid according to claim 1, said supporting structure comprising at least a first leaf spring in a first sheath and a second leaf spring in a second sheath, the collective spring/sheath combinations being connected to each other to thereby extend about the exterior of the strip array.

6. The control grid according to claim 5, wherein each said spring is biased to urge said supporting structure toward the expanded configuration.

7. The control grid according to claim 1, further comprising, at an outer circumferential side of said supporting structure, a retainer configured to retain said supporting structure at the enclosure of the light emission aperture of the light source.

8. The control grid according to claim 7, wherein said retainer comprises a hook-and-loop material strip.

9. A method of manufacturing the control grid according to claim 1, the control grid having light-transmitting cells defined by cell circumferences, the method comprising:
    providing strips of a light-absorbing material;
    arranging the strips adjacent to one another;
    fixing adjacent ones of the strips together at fixing portions such that adjacent ones of the fixing portions facing the same direction are spaced apart from each other by about one half cell circumference, whereby the fixing portions define the cell circumference, the fixing portions facing the same direction in adjacent strips being positioned offset from each other; and
    attaching the strips, so fixed to one another, to a supporting structure.

10. The method according to claim 9, wherein the fixing portions comprise adhering portions where adjacent strips are one of adhered and welded to one another, providing an array of cells.

11. The method according to claim 9, wherein the fixing portions comprise portions where the adjacent strips are one of sewn and woven together, providing an array of cells.

12. The method according to claim 11, wherein the array of cells is one of adhered and welded to a like array of cells.

13. The control grid according to claim 1, wherein a given said side member comprises at least one transversely bent strip acting as a leaf spring.

14. A control grid configured to be positioned at a light emission aperture, said control grid comprising:
    a side-by-side array of flexible strips of light-absorbing material, which strip array delimits light-transmitting cells such that light emanating from the light source, at an angle of at least 20 degrees from a central axis of such light source, impinges on the light-absorbing material; and
    a supporting structure configured to releasably attach the flexible strip array to an enclosure of the light emission aperture of such light source, said supporting structure further including a tensioning device configured to urge said control grid into a circumferential shape corresponding to a circumferential shape of such light emission aperture of such light source, wherein said tensioning device comprises at least one transversely bent strip acting as a leaf spring.

15. The control grid according to claim 14, wherein said tensioning device comprises an elastic member which connects adjacent sides of said supporting structure and urges said supporting structure into the outstretched configuration.

16. The control grid according to claim 14, further comprising, at an outer circumferential side of said supporting structure, a retainer configured to retain said supporting structure at the enclosure of the light emission aperture of the light source.

17. The control grid according to claim 16, wherein said retainer comprises a hook-and-loop material strip.

18. The control grid according to claim 14, comprising plural fasteners for attaching said strip array to said supporting structure, each of said plural fasteners comprising a rigid part configured to be positioned against said supporting structure, and to attach said strip array to said rigid part, and a resiliently flexible part configured to secure said rigid part to said supporting structure.

19. The control grid according to claim 18, said resiliently flexible part, in use, being positioned around said supporting structure, and opposing ends of said flexible part being connected to said rigid part.

20. The control grid according to claim 18, said rigid part further being configured to receive elastic holding straps attached to said strip array.

* * * * *